(12) United States Patent
Knoll et al.

(10) Patent No.: US 6,724,450 B1
(45) Date of Patent: Apr. 20, 2004

(54) LIQUID CRYSTAL DISPLAY WITH SWITCHABLE VIEW ANGLE

(75) Inventors: Peter Knoll, Ettlingen (DE); Hagen Klausmann, Erlangen (DE); Ewald-Theodor Ginter, Stuttgart (DE); Martin Schadt, Selitsberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/589,649

(22) Filed: Jun. 8, 2000

(30) Foreign Application Priority Data

Jun. 8, 1999 (DE) .......................... 199 25 985

(51) Int. Cl.[7] .......................... G02F 1/1337
(52) U.S. Cl. .......................... 349/129
(58) Field of Search .......................... 345/129, 65, 179, 345/33, 143

(56) References Cited

U.S. PATENT DOCUMENTS

| | | | | |
|---|---|---|---|---|
| 5,280,375 A | * | 1/1994 | Tsuda et al. | 349/129 |
| 5,638,201 A | * | 6/1997 | Bos et al. | 349/129 |
| 5,757,454 A | * | 5/1998 | Ogishima et al. | 349/129 |
| 5,777,000 A | * | 7/1998 | Sakagami et al. | 349/129 |
| 5,808,705 A | * | 9/1998 | Hishida et al. | 349/129 |
| 5,818,560 A | * | 10/1998 | Kouno et al. | 349/129 |
| 5,855,968 A | * | 1/1999 | Hirata et al. | 349/130 |
| 6,040,884 A | * | 3/2000 | Yasuda et al. | 349/133 |

OTHER PUBLICATIONS

"Development of a Dueldomain TFT–LCDS by Optical Patterning" H, Klausmann et al, SID Digest of Technical L Papers, 1998, Anaheim, USA.

* cited by examiner

Primary Examiner—Toan Ton
(74) Attorney, Agent, or Firm—Michael J. Striker

(57) ABSTRACT

A liquid crystal display has a plurality of image elements, all the image elements are subdivided identically into at least two zones, the zones being formed so that they have different liquid crystal structures, each of the zones of a respective one of the image elements being electrically controllable.

13 Claims, 4 Drawing Sheets

LIQUID CRYSTAL DISPLAY WITH SWITCHABLE VIEW ANGLE

BACKGROUND OF THE INVENTION

The present invention relates to a liquid crystal display with a switchable view angle.

The publication "Development of a Dual Domain TFT-LCD Biocomptable Paterning" (H Klausmann, et al, SID Digest of Technical Papers, 1998 Anaheim, USA), discloses a liquid crystal display with dual-domain liquid crystal cells. With this dual domain liquid crystal cells, an individual viewpoint element is subdivided into two zones. In these zones, the liquid crystal has a different orientation. Thereby the view angle region of the liquid crystal display is expanded.

SUMMARY OF THE INVENTION

Accordingly, it is an object of the present invention to provide a liquid crystal display which has advantage that the individual zones of an image point element which have different orientation are controllable electrically separately. Therefore for the liquid crystal display, uniformly designed image point elements are arranged near one another.

Identically oriented zones of an image point element have the same view angle. This view angle is limited only right with an orientation direction of the liquid crystals. This means however that from different image angle regions of the inventive liquid crystal display, exclusively one image is visible, which is produced by the image element zones of only one liquid crystal orientation. In accordance with the present invention, in contrast to the prior art, these individual zones are controlled electronically separately. Thereby it is possible to make visible simultaneously different images in different image angle regions.

The possibility to perform the electrical control via different column conductors, different line conductors or via a subdivision of the front plane electrode allows an adaptation of the desired layout of the image element. Further, an adaptation of the use driver and the control circuit is possible. It should be also noted that the line driver as a rule is more favorable than the column driver.

It is further advantageous that, in addition to the possibility to see two different images simultaneously from two different viewing directions, there are other illustration possibilities. On the one hand, it is possible to switch the liquid crystal display for one view direction to be dark or bright, or in other words to show no image information. From the other image direction an image information can be recognized. Further, there is a possibility for both viewing directions to show the same image information.

In a limiting view angle region, in which at least two different image informations are visible, there is firstly the possibility to provide a stereoscopic image information. This is advantageous for example for the three dimensional representation of a land map, for example for the use in connection with a navigation system.

The rear illumination through two correspondingly modified light conductors, with two different light sources provides the advantage of a separated rear illustration for individual image point elements. It is therefore for example possible that each observer of the can individually regulate the display brightness for its view angle region.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

The liquid crystals in the liquid crystal display are located between two glass plates, on which additional layers, for example orientation layers, can be applied. On one glass side, in immovable condition all elongated liquid crystal molecules are oriented with their longitudinal axes parallel to the glass outer surface. All liquid crystal molecules extend with their longitudinal axes in one direction. Over the line distance, the direction of the longitudinal axes of the liquid crystal molecules changes, so that over the line distance a turning of the molecule by 90° is performed.

One possibility to produce zones of different orientation is to orient the liquid crystal so that in one zone a turning by the angle +90° and in another zone a turning by the angle of −90° is performed. Furthermore, it is also possible to change over the line distance, the angle of the longitudinal axis with the glass outer surface. A different photo orientation is obtained in that in one zone the longitudinal axes of the liquid crystal molecules on one glass side enclose with the glass surface an angle plus θ and in another zone enclose an angle minus θ. This angle is identified as a tilting angle of the liquid crystal. Its value is preferable located between 0° and 30°. In the following examples only the second type of liquid crystal orientation, which is provided by the orientation by different tilting angles is described.

Figure 1:
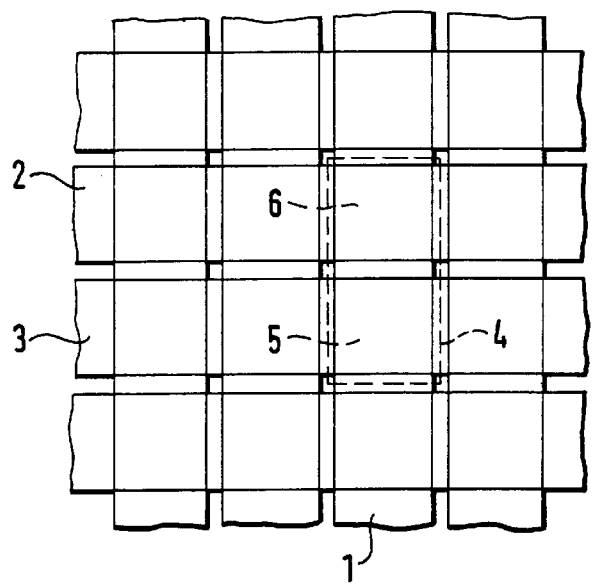
FIG. 1 is a view showing a liquid crystal display in accordance with the present invention, formed as a passive liquid crystal display.

FIG. 1 shows a liquid crystal display which is formed as an X-Y matrix. The display is controlled via column conductors 1, and line conductor 2, 3, which are arranged perpendicularly to one another. The column or line conductors are located on different glass substrates, between which the not shown liquid crystal is located. The addressing of the image screen is passive. In other words, it provides no active switching (for example a thin film transistor) on each image point. Instead, the information is inscribed by corresponding signals on the line and column conductors in line sequence in the image screen. An individual image element is formed from the intersection of a column 1 and two line conductors 2, 3. Only for this selected image element important conductors are marked.

As line and column electrode material, transparent zinc-indium oxide (ITO) is used. An image element 4 is selected in FIG. 3 and for better illustration is encircled with a broken line. It is subdivided in a two zones 5, 6. In this example as in the following examples, the different zones are selected to have identical sizes. In one zone 5, for example by photo orientation of the liquid crystal, or by a different, comparable method, the liquid crystal structure is tilted by the angle +θ. In the other zone 6, the liquid crystal structure to the contrary is tiled by the angle −θ. Each of the two zones is associated with one line conductor 2 or 3, while neighboring image point halves are covered with the same tilting of the liquid crystal. Since the different tilting of the liquid crystal causes the change of the view angle, the view angle regions associated with the angle +θ and angle −θ are controllable by different line conductors separately.

Figure 2:
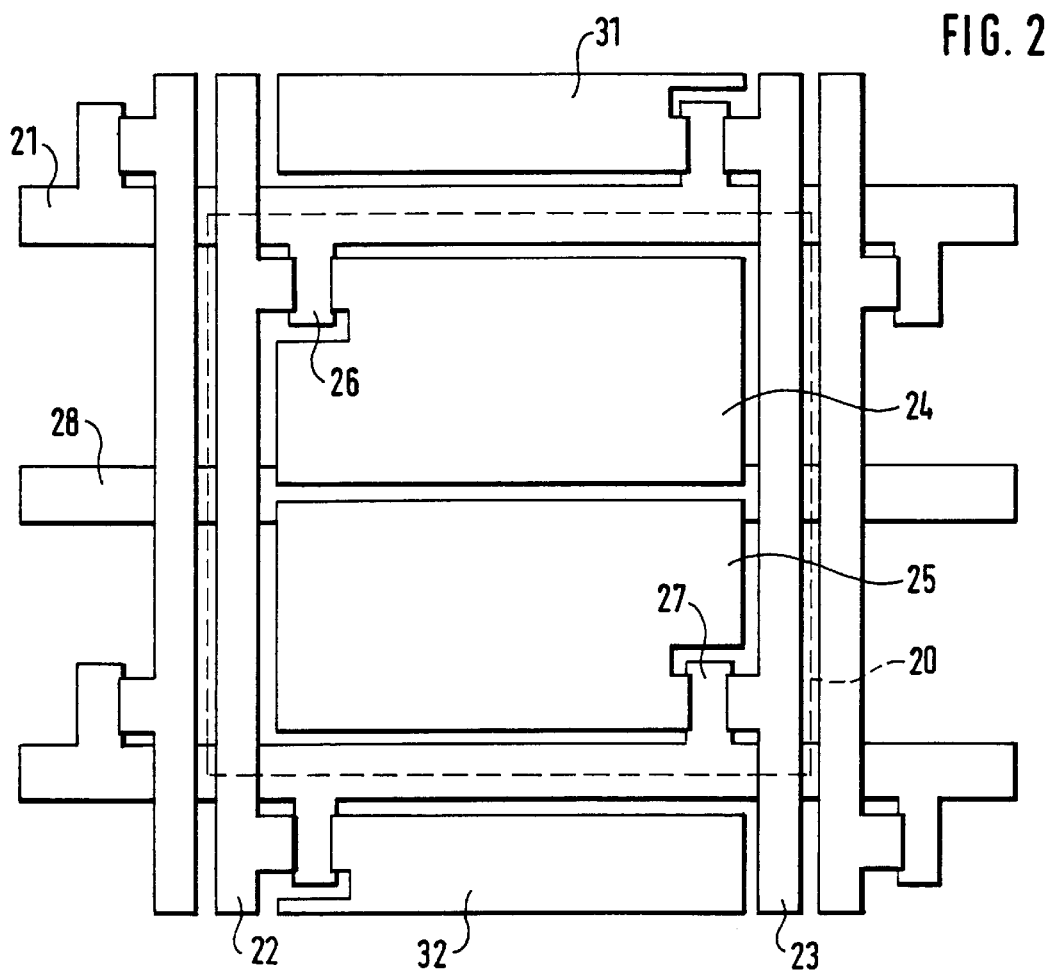
FIG. 2 is a view showing an inventive liquid crystal display formed as an active-matrix liquid crystal display with different column conductors for each zone of an image point element.

FIG. 2 shows a further embodiment of the inventive liquid crystal display. The liquid crystal display is here formed as an active matrix. An image element 20 is selected. The control is performed through a line conductor 21 and through column conductors 22, 23. The image element 20 is subdivided into two zones 24 and 25, each having its own control transistor 26 or 27. It has a joint storage conductor 28. In the upper zone 24 the liquid crystal structure is tiled by the angle +θ and in the lower zone 25 it is tiled by the angle −θ. During one line cycle X, the zone 24 and a zone 31 of the upper limiting image element are controlled simultaneously. During the subsequent line cycles X+1 the zone 25 and a zone 32 of the downwardly adjoining image element are controlled simultaneously. As a result, the column information for all lower image element zones 25, 31, etc. are displaced by one line cycle relative to the information for the upper image element zones 24, 32, etc., when the information is inscribed linewise in the display.

The image information for the upper and lower image element zones can be different. The separate storage conductor 28 acts, in addition to its storage function, also as a black matrix between the zones. Some aperture loss due to the double number of the column conductors can be compensated by a more intensive rear illumination. In particular with the use in motor vehicles, in which a sufficient current source is always available, a higher power reception of the rear illumination causes no problems.

Figure 3:
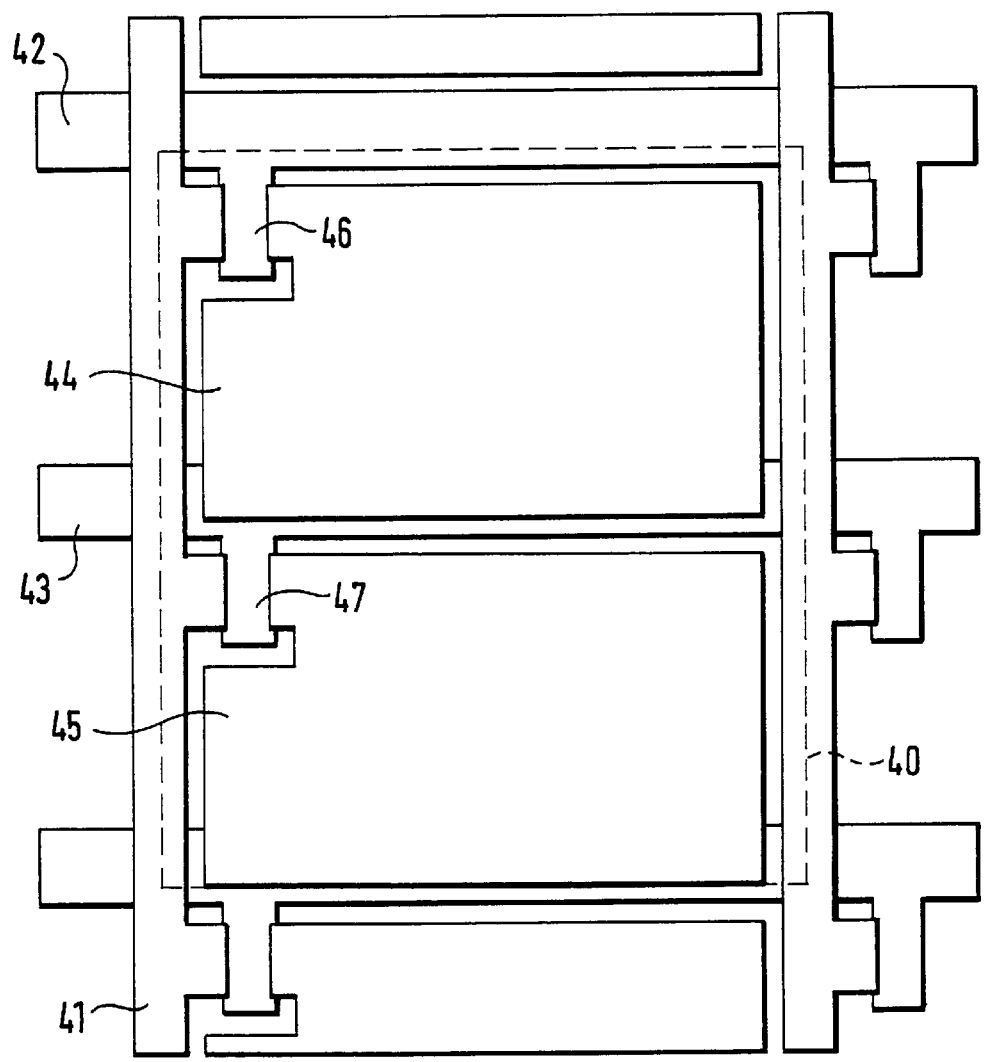
FIG. 3 is a view showing a liquid crystal display in accordance with the present invention with different line conductors for each zone of an image point element.

FIG. 3 shows another embodiment of the inventive liquid crystal display. It is also an active matrix liquid crystal display with a selected image element 40. The control of this image element is performed via a column conductor 41 and via line conductors 42 and 43. The control of an upper image point zone 44 is performed through the transistor 46 and the control of a lower image point zone 45 is performed through the transistor 47. The orientation of the liquid crystals differs from one line to another. This guarantees the possibility to represent different images in different view angle regions. In contrast to the illustration in FIG. 2, per image element only one column and two line conductors are needed. This is advantageous since the line drivers are less expensive than column drivers.

Figure 4:
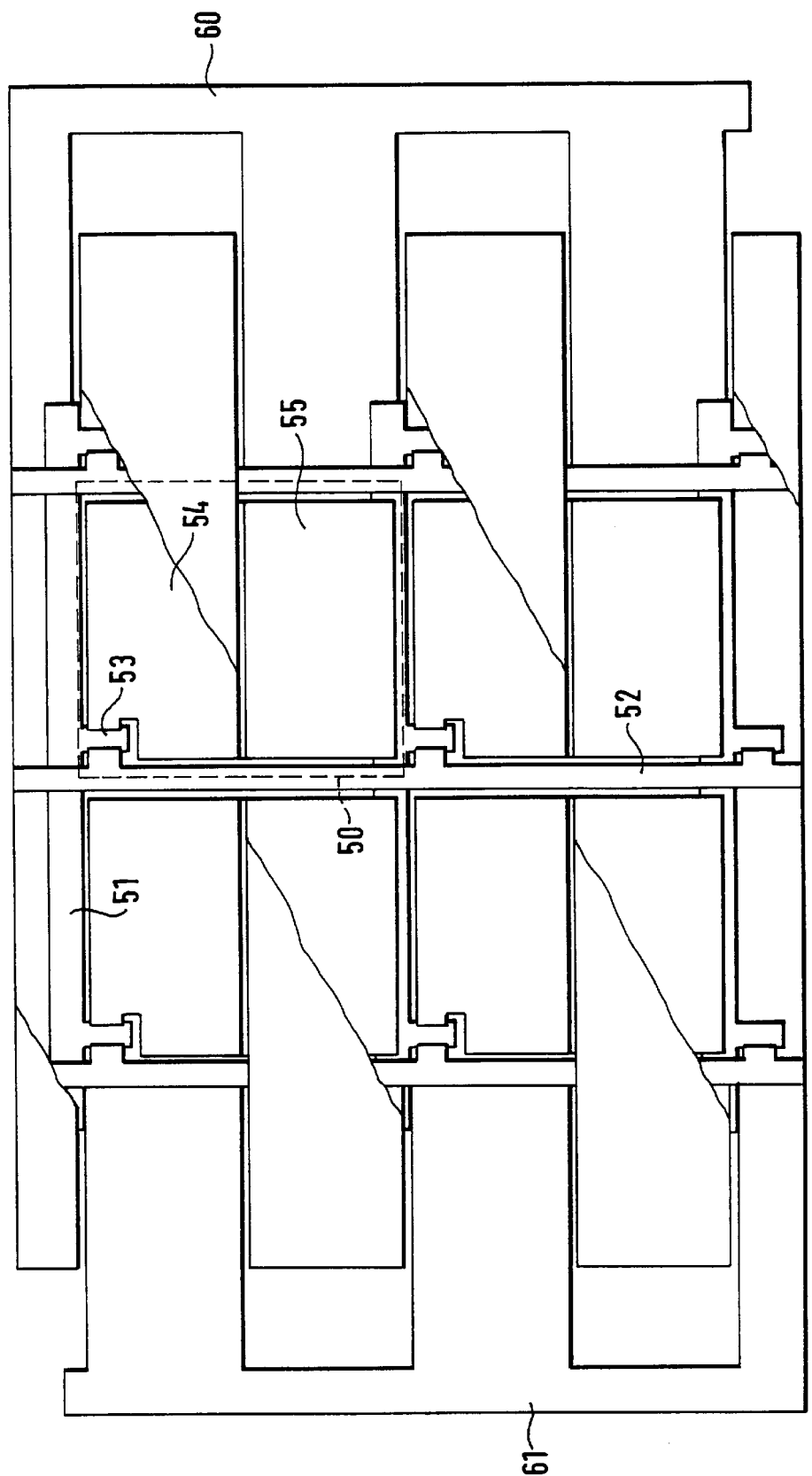
FIG. 4 is a view showing a liquid crystal display in accordance with the present invention with a subdivision of a front plane electrode.

FIG. 4 shows a further inventive arrangement. The liquid crystal display is here also formed as an active matrix. An image element 50 is selected. It is controlled via a line conductor 51 and a column conductor 52 with the transistor 53. The image point element 50 is subdivided into two zones with different liquid crystal structures. The liquid crystal in the zone 54 has the tilting angle +θ, the liquid crystal in the zone 55 has the tilting angle −θ. Between the transparent front plane electrode 55, 56 and the matrix with transistors, line and column conductors, the not shown liquid crystal which is enclosed by two glass plates is located. The front plane electrodes 55 and 56 are finger shaped, so that they do not intersect. They are electrically separated. The front plane electrode 60 covers the lower zone of the image point element, all liquid crystals with the tilting angle −θ, for example 55. The front plane electrode 61 overlaps the upper zone of the image point element, all with tilting angle +θ of the liquid crystal, for example 54.

Two control types are proposed. In accordance with a first control type, a rectangular alternating voltage is applied to both front plane electrodes. Additionally, one of the both front plane electrodes, for example the front plane electrode 60 obtains an alternating signal with the image repeat frequency to avoid a flickering. The voltage of this alternating signal is selected so that for example all image point zones which belong to the front plane electrode 60 are switched to be dark. The second control type is to apply rectangular alternating voltages of different amplitudes to both front plane electrodes 60 and 61. The voltages are selected so that with a lowering amplitude the standard image representation is obtained and with a higher amplitude the corresponding zones of the image element are made dark.

With this two control types, three operational types are possible:

Both line electrodes are operated parallel and the information is well read from both sides;

Only one of the both lines is controlled, and the image is recognized only from one side (only from right or only from left side)

Different column signals are applied during controlling of each of a front plane electrode. In this case two different images are recognized from separate view positions. With the alternating current applied to the front plane electrodes, the turns in a view angle region correspondingly from bright to dark switching of the display in an image representation.

Figure 5:
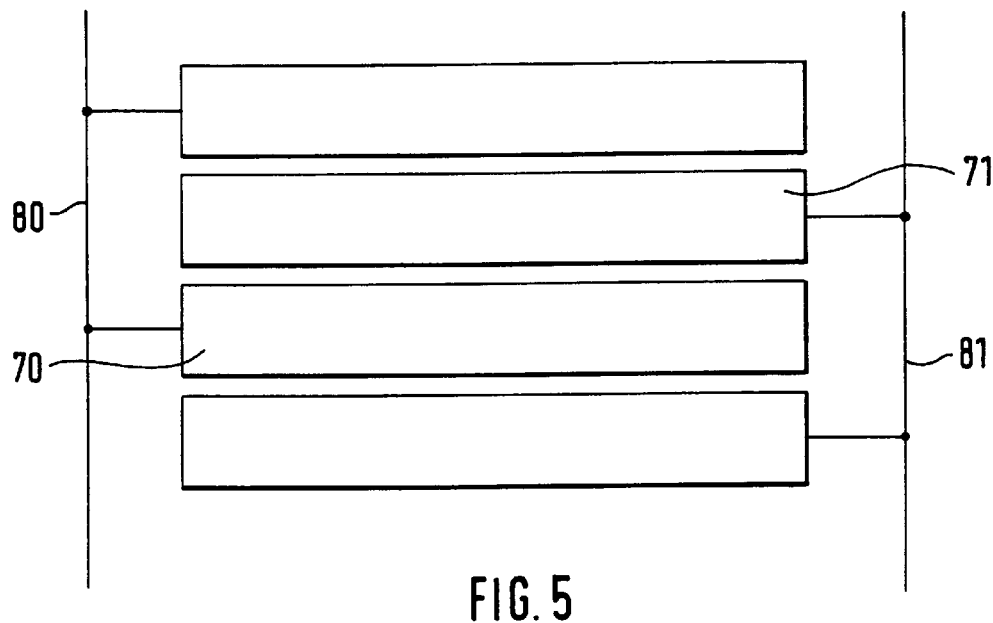
FIG. 5 is a view showing a variant of the embodiment of FIG. 4.

FIG. 1 shows a special variation of this embodiment, in which the finger-shaped front plane electrodes are replaced by electrodes in line form 70, 71. They are joined with thin conductive connections 80, 81, for example low ohmic metal layers. In FIG. 5 the front plane electrodes 70, 71 and the conductive connections 80, 81 are shown. In the control, there are no differences from the arrangement shown in FIG. 4.

Figure 6:
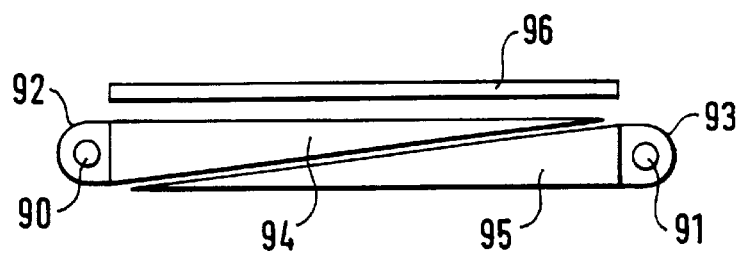
FIG. 6 is a view showing a liquid crystal display with the use of two light guides and two light sources for separate rear illumination of different image angle regions.

FIG. 6 shows a further embodiment of the inventive liquid crystal display. Here it is of a special rear light type with two bar-shaped light sources 90 and 91, for example cold cathode fluorescent lamps (CFL), with reflectors 92 and 93. The light of the light sources 90 and 91 is coupled through the reflectors 92 and 93 into two light guides 94 and 95 which are provided on their outer surface with a prism structure. The prism structure is designed so that the light is emitted only in a selected view angle region. Due to the separated control of both light sources 90 and 91, for each view angle region a separate brightness control is possible. In motor vehicles it is possible therefore that the driver and the passenger individually adjust their brightness.

It will be understood that each of the elements described above, or two or more together, may also find a useful application in other types of constructions differing from the types described above.

While the invention has been illustrated and described as embodied in liquid crystal display with switchable view angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A liquid crystal display, comprising a plurality of image elements, each of all said image elements are subdivided in the same way into at least two zones, said zones of each of said image elements being formed so that they have different liquid crystal structures in immovable condition, so that a first of the zones of each of said image elements in immovable condition has a first liquid crystal structure and a second zone of each of said image elements in immovable condition has a second liquid crystal structure, said first zone of each of said image elements being electrically controllable and said second zone of each of said image elements being electrically controllable separately from said first zone of a corresponding one of said image elements.

2. A liquid crystal display as defined in claim 1; and further comprising different column conductors via which different ones of said zones of a respective one of said image elements are controllable.

3. A liquid crystal display as defined in claim 1; and further comprising different line conductors via which different ones of said zones of a respective one of said image elements are controllable.

4. A liquid crystal display as defined in claim 1; and further comprising different transparent front plane electrodes through different ones of said zones of each of said image elements are selectable, so that the first zone of the image element with the first liquid crystal is controllable by a first transparent front plane electrode, while the second zone of the image element with the second liquid crystal structure is controllable by a second front plane electrode.

5. A liquid crystal display as defined in claim 1, wherein said different liquid crystal structures of said zones are formed by a tilting of liquid crystals.

6. A liquid crystal display as defined in claim 5, wherein a value of a tilting angle of said different liquid crystal structures for the liquid crystal is within a range between 0° and 30°.

7. A liquid crystal display as defined in claim 1, wherein a difference in the liquid crystal structures is provided by an opposite twisting of a liquid crystal by 90°, so that in the first zone of the image element a twisting of +90° is provided and in the second zone of the image element a twisting by −90° is provided.

8. A liquid crystal display as defined in claim 1, wherein said image elements are formed so that, depending on a viewing angle, simultaneously a first image or a second image is visible, and in a first viewing direction a first image is produced in the first zone of the image elements while in a second viewing direction a second image is produced in the second zone of the image elements, with the first image and the second image being different from one another.

9. A liquid crystal display as defined in claim 1, wherein said image elements are formed so that depending on a view angle, one image is visible over an image representation does not occur, and in a first viewing direction a first image is produced in the first zone of the image elements while in a second viewing direction a second image is produced in the second zone of the image elements, with the first image and the second image being different from one another.

10. A liquid crystal display as defined in claim 1, wherein said image elements are formed so that an image is visible in a whole display region, and in a first viewing direction a first image is produced in the first zone of the image elements while in a second viewing direction a second image is produced in the second zone of the image elements, with the first image and the second image being different from one another.

11. A liquid crystal display as defined in claim 1, wherein said image elements are formed so that a combination of two partial images in an image angle region, so that two different images are visible and a three dimensional image representation is provided, and in a first viewing direction a first image is produced in the first zone of the image elements while in a second viewing direction a second image is produced in the second zone of the image elements, with the first image and the second image being different from one another.

12. A liquid crystal display as defined in claim 1; and further comprising rear illumination means including at least two different light guides and at least two different light sources whose light is deviated by said light guides in different view angle regions.

13. A liquid crystal display as defined in claim 1; and further comprising rear illumination means including at least two different light guides and at least two different light sources whose light is deviated by said light guides in different view angle regions.

* * * * *